United States Patent
Jeon

(10) Patent No.: US 12,371,830 B2
(45) Date of Patent: Jul. 29, 2025

(54) METHOD AND APPARATUS FOR 3D CLOTHING DRAPING SIMULATION

(71) Applicant: CLO virtual fashion, Seoul (KR)

(72) Inventor: In Yong Jeon, Seoul (KR)

(73) Assignee: CLO Virtual Fashion Inc., Seoul (KR)

( * ) Notice: Subject to any disclaimer, the term of this patent is extended or adjusted under 35 U.S.C. 154(b) by 703 days.

(21) Appl. No.: 17/667,819

(22) Filed: Feb. 9, 2022

(65) Prior Publication Data
US 2022/0267938 A1    Aug. 25, 2022

Related U.S. Application Data

(62) Division of application No. 15/474,091, filed on Mar. 30, 2017, now Pat. No. 11,280,036.

(30) Foreign Application Priority Data

Sep. 28, 2016    (KR) .................. 10-2016-0125040

(51) Int. Cl.
*D05B 19/12*    (2006.01)
*A41H 3/00*    (2006.01)
(Continued)

(52) U.S. Cl.
CPC ............ *D05B 19/12* (2013.01); *A41H 3/007* (2013.01); *D05B 19/10* (2013.01); *G06T 7/62* (2017.01);
(Continued)

(58) Field of Classification Search
CPC ........ D05B 19/02; D05B 19/08; D05B 19/10; D05B 19/12; G06T 19/20; G06T 2210/16; A41H 3/007
See application file for complete search history.

(56) References Cited

U.S. PATENT DOCUMENTS 4,926,344 A * 5/1990 Collins .................. A41H 3/007
706/53
6,052,482 A    4/2000 Arai et al.
(Continued)

FOREIGN PATENT DOCUMENTS

JP          3744997 B2    2/2006
KR    10-1106104 B1    1/2012
(Continued)

OTHER PUBLICATIONS

Volino, P. et al., "Resolving surface collisions through intersection contour minimization," ACM Trans. Graph, vol. 25. No. 3, 2006 (6 pages).
(Continued)

*Primary Examiner* — Nathan E Durham
(74) *Attorney, Agent, or Firm* — WTA Patents

(57) ABSTRACT

When producing a piece of three-dimensional (3D) clothing through a computer simulation, a 3D clothing draping simulation method includes inputting a two-dimensional (2D) clothing pattern, inputting a pattern block, matching the input 2D clothing pattern to the input pattern block, converting the matched 2D clothing pattern and pattern block into a database (DB), selecting a pattern block which is matched with 2D clothing pattern from the pattern block database, and automatically sewing 2D clothing patterns matched with selected pattern blocks together according to sewing information of the pattern blocks.

8 Claims, 8 Drawing Sheets

(51) Int. Cl.
  *D05B 19/10* (2006.01)
  *G06T 7/62* (2017.01)
  *G06T 11/00* (2006.01)
  *G06T 19/00* (2011.01)
  *G06T 19/20* (2011.01)

(52) U.S. Cl.
  CPC .............. *G06T 11/00* (2013.01); *G06T 19/00* (2013.01); *G06T 19/20* (2013.01); *G06T 2207/20221* (2013.01); *G06T 2210/16* (2013.01); *G06T 2219/2004* (2013.01)

(56) References Cited

U.S. PATENT DOCUMENTS

| | | |
|---|---|---|
| 7,079,134 B2 | 7/2006 | Kung et al. |
| 7,657,340 B2 | 2/2010 | Lind |
| 8,116,896 B2 | 2/2012 | Ko |
| 2001/0026272 A1 | 10/2001 | Feld |
| 2006/0287877 A1* | 12/2006 | Wannier ................. G06Q 30/02 |
| | | 707/999.1 |
| 2009/0099683 A1 | 4/2009 | Lastra et al. |
| 2009/0112353 A1 | 4/2009 | Kirefu et al. |
| 2009/0222127 A1 | 9/2009 | Lind |
| 2010/0305909 A1* | 12/2010 | Wolper ................... G06T 17/00 |
| | | 703/1 |
| 2013/0057544 A1 | 3/2013 | Oh |
| 2014/0114620 A1 | 4/2014 | Grinspun et al. |
| 2016/0309822 A1 | 10/2016 | Ng et al. |

FOREIGN PATENT DOCUMENTS

| | | |
|---|---|---|
| KR | 10-2014-0108451 A | 9/2014 |
| KR | 10-1627114 B1 | 6/2016 |

OTHER PUBLICATIONS

Korean Office Action issued on May 23, 2017 in corresponding Korean Patent Application No. 10-2016-0125040 (7 pages in Korean).

* cited by examiner

METHOD AND APPARATUS FOR 3D CLOTHING DRAPING SIMULATION

CROSS-REFERENCE TO RELATED APPLICATION(S)

This is a divisional application of U.S. application Ser. No. 15/474,091, filed on Mar. 30, 2017, which claims priority from Korean Patent Application No. 10-2016-0125040, filed on Sep. 28, 2016, in the Korean Intellectual Property Office, the disclosure of which is incorporated herein by reference in its entirety.

STATEMENT REGARDING FOREIGN GOVERNMENT SPONSORED RESEARCH OR DEVELOPMENT

This invention (R2015040052) was made with the support of the Ministry of Culture, Sports and Tourism (MCST) and the Korea Creative Content Agency (KOCCA), both agencies of the government of the Republic of Korea.

BACKGROUND

1. Field

The following description relates to a computer simulation technology, and more particularly, to a draping simulation technology for draping two-dimensional clothing patterns on an avatar.

2. Description of Related Art

Currently, a clothing simulation technology is used in various fields, not only in the fashion industry but also in the videogame, animation, movie, and special effect fields. In a virtual world, a market for sales of costume items amounts to several trillion won.

Laid-open publication No. 10-2014-0108451 published on Sep. 11, 2014 discloses a method of draping a piece of clothing on a three-dimensional (3D) avatar as a process of a 3D clothing draping simulation. In a process of generating a clothing-dressed avatar by arranging two-dimensional (2D) patterns around the avatar and sewing the 2D patterns together, the pattern may penetrate into the avatar so that an intersection between the pattern and the avatar may occur. In order to remove such an intersection, the draping method includes determining an occurrence of an intersection by finding a mesh where an intersection between a pattern and an avatar occurs, generating an intersection removing force having a predetermined magnitude to push the mesh outward from a skin of the avatar when there is a mesh having intersection, and applying the intersection removing force to the mesh so that the intersection is removed.

The process of producing a piece of 3D clothing by using the above-described method requires a user input process of drawing patterns through a user interface (UI), selecting borders of patterns to be sewn together to input sewing information, and properly arranging the patterns on a 3D model for draping.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The following description relates to grouping or blocking types of two-dimensional (2D) patterns forming each piece of clothing according to clothing types, and providing the grouped or blocked types of 2D patterns as a database (DB).

The following description relates to providing sewing-related information of 2D patterns forming a piece of clothing as a DB.

The following description relates to generating a piece of three-dimensional (3D) clothing by automatically sewing patterns together through the grouped types of patterns and the DB of sewing-related information.

In one general aspect, a 3D clothing draping simulation method includes: inputting a 2D clothing pattern; inputting a pattern block; matching the input 2D clothing pattern to the input pattern block; converting the matched 2D clothing pattern and pattern block into a DB; selecting a pattern block which is matched with the 2D clothing pattern from the pattern block DB; and automatically sewing 2D clothing patterns matched with selected pattern blocks together according to sewing information of the pattern blocks.

The pattern block may include edges respectively corresponding to sewing units of a 2D clothing pattern, and automatic sewing information about the sewing unit of the 2D clothing pattern corresponding to each of the edges may be set at the edges.

The matching of the input 2D clothing pattern to the input pattern block may include automatically matching the input 2D clothing pattern to the pattern block by analyzing a shape of the input 2D clothing pattern.

The matching of the input 2D clothing pattern to the input pattern block may further include verifying whether the 2D clothing pattern matched with the pattern block is a pattern corresponding to the pattern block.

The inputting of a 2D clothing pattern may further include inputting a clothing template that is a group of 2D clothing patterns forming a piece of 3D clothing.

The method may further include, before the automatic sewing, comparing lengths of sewing lines of 2D patterns to be sewn together and automatically grading sizes of the 2D patterns to be the same.

In another general aspect, a clothing pattern DB generation apparatus includes a pattern input unit configured to input a 2D clothing pattern, a pattern block input unit configured to input a pattern block, a pattern block matching unit configured to match the input 2D clothing pattern to the input pattern block, and a pattern/block DB in which the matched 2D clothing pattern and pattern block are registered as a DB.

The pattern block may include edges respectively corresponding to sewing units of a 2D clothing pattern, and automatic sewing information about the sewing unit of the 2D clothing pattern corresponding to each of the edges may be set at the edges.

The pattern/block matching unit may automatically match the input 2D clothing pattern to the pattern block by analyzing a shape of the input 2D clothing pattern.

The apparatus may further include a matching verification unit configured to verify whether the 2D clothing pattern matched with the pattern block is a pattern corresponding to the pattern block.

The pattern input unit may further include a 2D clothing template selection unit configured to input a clothing template that is a group of 2D clothing patterns forming a piece of 3D clothing.

In another general aspect, an 3D clothing draping simulation apparatus includes a pattern block selection unit configured to select a pattern block matched with a 2D clothing pattern from a pattern block DB; and an automatic sewing unit configured to automatically sew 2D clothing patterns matched with selected pattern blocks together according to sewing information of the pattern blocks.

The automatic sewing unit may be configured to compare lengths of sewing lines of 2D patterns to be sewn together and automatically grade sizes of the 2D patterns to be the same.

In another general aspect, a system for providing a 3D clothing draping simulation includes a clothing pattern DB generation apparatus and a 3D clothing draping simulation apparatus, wherein the clothing pattern DB generation apparatus includes: a pattern input unit configured to input a 2D clothing pattern; a pattern block input unit configured to input a pattern block; a pattern/block matching unit configured to match the input 2D clothing pattern to the input pattern block; and a pattern/block DB in which the matched 2D clothing pattern and pattern block are registered as a DB, wherein the 3D clothing draping simulation apparatus includes: a pattern block selection unit configured to select a pattern block matched with a 2D clothing pattern from the pattern/block DB received from the clothing pattern DB generation apparatus; an automatic sewing unit configured to automatically sew 2D clothing patterns matched with selected pattern blocks together according to sewing information of the pattern blocks; a draping unit configured to drape the 2D clothing patterns on an avatar model; and a display unit configured to render and display a result of the draping.

Other features and aspects will be apparent from the following detailed description, the drawings, and the claims.

Figure 1:
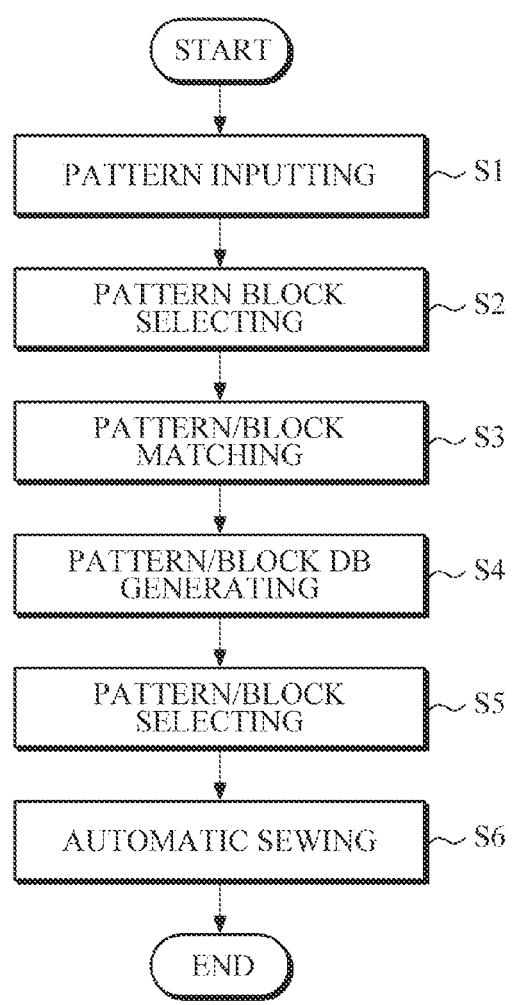
FIG. 1 is a flowchart showing a configuration of a three-dimensional (3D) clothing draping simulation method according to one exemplary embodiment.

Throughout the drawings and the detailed description, unless otherwise described, the same drawing reference numerals should be understood as referring to the same elements, features, and structures. The relative size and depiction of these elements may be exaggerated for clarity, illustration, and convenience.

DETAILED DESCRIPTION

The foregoing and additional aspects of the present invention will become readily apparent through the following exemplary embodiments. Hereinafter, the exemplary embodiments of the present invention will be described in detail with reference to the accompanying drawings so that the present invention may be readily implemented by those skilled in the art. It should be noted that the present invention may not be limited to the illustrative embodiments and examples but can be embodied in various other ways.

In the drawings, parts irrelevant to the description are omitted for the simplicity of explanation, and like reference numerals denote like parts through the whole document. Through the whole specification, the terms "comprises," "includes," "comprising," and "including" used in the document mean that one or more other components, steps, operation and/or the existence or addition of elements are not excluded in addition to the described components, steps, operation and/or elements unless context dictates otherwise. In the specification, the term of "unit" may refer to "a block allowing a system of hardware or software to be changed or plugged-in", that is, a unitary part or a block configured to perform a function of hardware or software.

As for a three-dimensional (3D) clothing draping simulation method, a method and apparatus for sewing patterns by converting sewing information about clothing patterns into a database (DB) and a medium recording a computer program for executing the method may be applied to a 3D simulation technology.

Hereinafter, the present invention will be described in detail.

A piece of 3D clothing is generated through a computer simulation program which has an actual process of producing clothing as a motive and reflects the actual process. For example, a producer draws a two-dimensional (2D) pattern of the piece of clothing, and simulates draping the 2D pattern on an avatar model to be dressed. A result of the draping is rendered and displayed so that the piece of 3D clothing is output on a screen. The avatar model and the 2D clothing pattern to be used in the simulation may be directly drawn by a user through a computer program or stored. When a user directly draws the avatar model and the 2D clothing pattern, the avatar model and the 2D clothing pattern may be input by using various pieces of graphic software or computer aided design (CAD) programs or by using a provided pattern producing tool.

In a 3D clothing draping simulation method according to one exemplary embodiment, the draping simulation method includes converting a 2D pattern into meshes, arranging patterns around an avatar, determining a collision between the pattern and the avatar, generating a collision removing force, and performing a draping simulation process.

As one exemplary embodiment, the draping simulation process may be provided using the method disclosed in the document [Pascal Volino, Nadia Magnenat Thalmann: Resolving surface collisions through intersection contour minimization. ACM Trans. Graph. 25(3): 1154-1159 (2006)].

FIG. 1 is a flowchart showing a configuration of a method for generating a piece of 3D clothing by using a pattern block in a 3D clothing draping simulation method according to one exemplary embodiment.

Referring to FIG. 1, a 3D clothing draping simulation method includes inputting a pattern (S1), inputting a pattern block (S2), matching a pattern/block (S3), generating a pattern/block DB (S4), selecting a pattern/block selecting (S5), and automatic sewing (S6).

A pattern block refers to a block that encloses each 2D pattern forming a piece of clothing, that is, a figure including sewing information about a 2D pattern. Details thereof will be described later.

According to an aspect, the inputting of a pattern S1 inputs a 2D clothing pattern. A 2D pattern according to one exemplary embodiment refers to a 2D object obtained by modeling a clothing pattern that is cut to form a piece of 3D clothing in a computer.

The 2D pattern is generated based on an appearance and a physical property of fabric. In order to represent an appearance of the 2D pattern, contour information of the 2D pattern needs to be input. A contour and vertex of the pattern may be generated by using a CAD tool and various graphic program tools. Alternatively, the contour and vertex of the pattern may be selected from a DB composed of 2D pattern models and used according to types of clothing. The inside of a 2D pattern, whose appearance is determined by the contour, is composed of triangular meshes or rectangular meshes. A mesh is composed of lattice points having mass and a spring connecting lattice points. Through the lattice point and the spring, a fabric property of the 2D pattern and an instantaneous appearance of the 2D pattern, such as folding and hanging, are represented. A seam is a line appearing after a sewing process that joins 2D patterns, and refers to an outer line or an inner line that is common to the 2D patterns.

In one exemplary embodiment, an input of a 2D pattern is performed by receiving a figure corresponding to a shape of the 2D pattern from a user through an input device such as a mouse.

Figure 2:
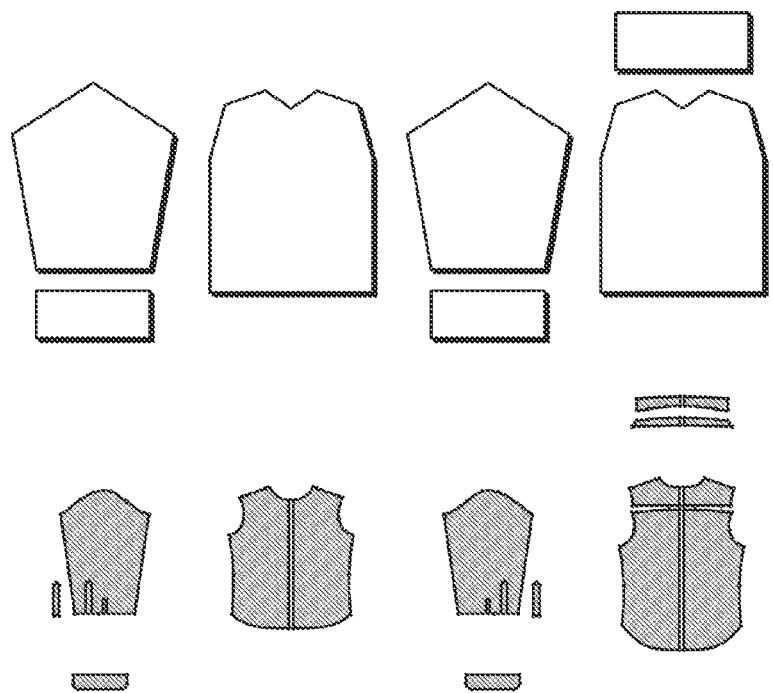
FIG. 2 is a diagram illustrating two-dimensional (2D) clothing patterns and pattern blocks according to one exemplary embodiment.

FIG. 2 is a diagram illustrating 2D patterns and pattern blocks according to one exemplary embodiment.

According to an aspect, the inputting of a pattern block S2 inputs a pattern block. In one exemplary embodiment, the pattern block is a polygon enclosing 2D patterns corresponding to the pattern block. For example, the pattern block may be a polygon shown in the upper part of FIG. 2. However, the definition of the pattern block is not limited thereto, and the pattern block may include not only a polygon but also a figure including a curved line. Referring to FIG. 2, pattern blocks required to generate a piece of clothing may be grouped together. A plurality of pattern blocks illustrated in FIG. 2 shows a group of pattern blocks required to generate a shirt.

Figure 6:
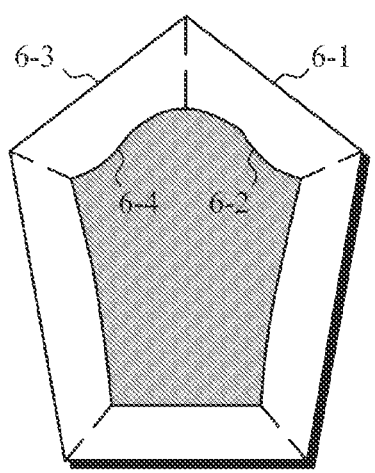
FIG. 6 is a diagram illustrating 2D clothing patterns and pattern blocks matched with each other according to another exemplary embodiment.

According to one detailed aspect, the pattern blocks include edges corresponding to sewing units of the 2D clothing pattern, and automatic sewing information for a sewing unit of the 2D clothing pattern corresponding to the edge is set in the pattern block. In detail, each edge of the pattern block represents a sewing unit of the pattern, and a border of the 2D pattern corresponding to each edge is set as a sewing unit. The sewing unit refers to a segment connecting two vertices. Referring to FIG. 6, an edge 6-1 of a pattern block corresponds to a part 6-2 of a 2D pattern, and an edge 6-3 of the pattern block corresponds to a part 6-4 of the 2D pattern.

Figure 3:
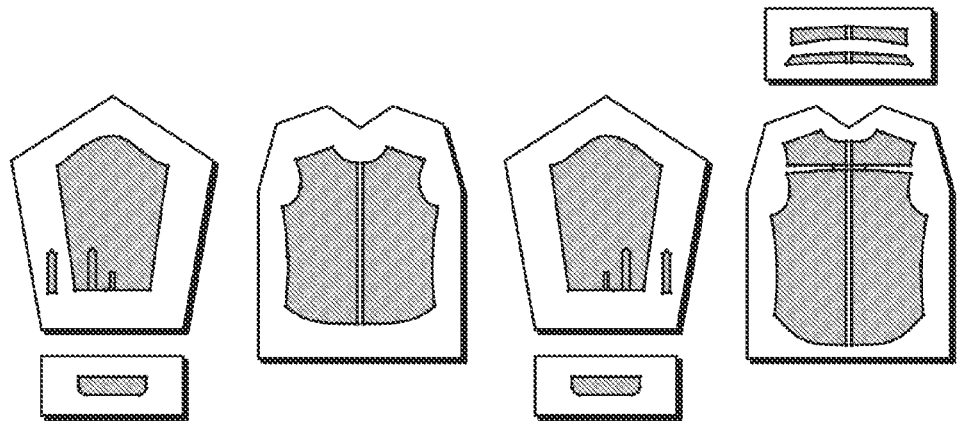
FIG. 3 is a diagram illustrating pattern blocks and 2D clothing patterns that are matched with each other according to one exemplary embodiment.

FIG. 3 is a diagram illustrating 2D patterns and pattern blocks that are matched with each other according to one exemplary embodiment.

According to an aspect, the matching of a pattern/block S3 matches the input clothing pattern to the input pattern block. In one exemplary embodiment, a user may match a pattern with a pattern block by clicking one of 2D clothing patterns and clicking a pattern block corresponding to the clicked pattern among pattern blocks. When a matching command with respect to a 2D pattern and a pattern block corresponding to the 2D pattern is input, the 2D pattern is placed in the pattern block. For example, when a matching command with respect to pattern blocks and 2D patterns is input, the 2D patterns are placed in the pattern blocks as shown in FIG. 3. For example, when a 2D pattern is dragged and dropped into a pattern block that is desired to be matched with the 2D pattern, the 2D pattern is matched with the pattern block.

Figure 4:
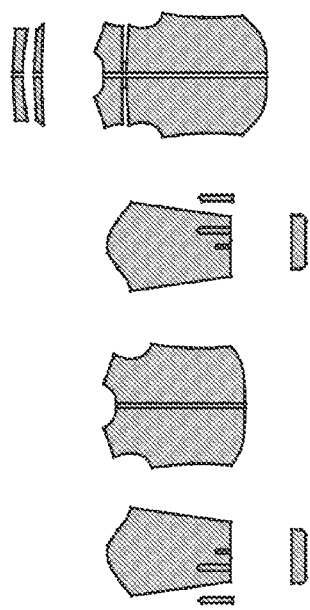
FIG. 4 is a diagram illustrating a piece of 3D clothing completed by sewing 2D clothing patterns together according to one exemplary embodiment.
Figure 4:
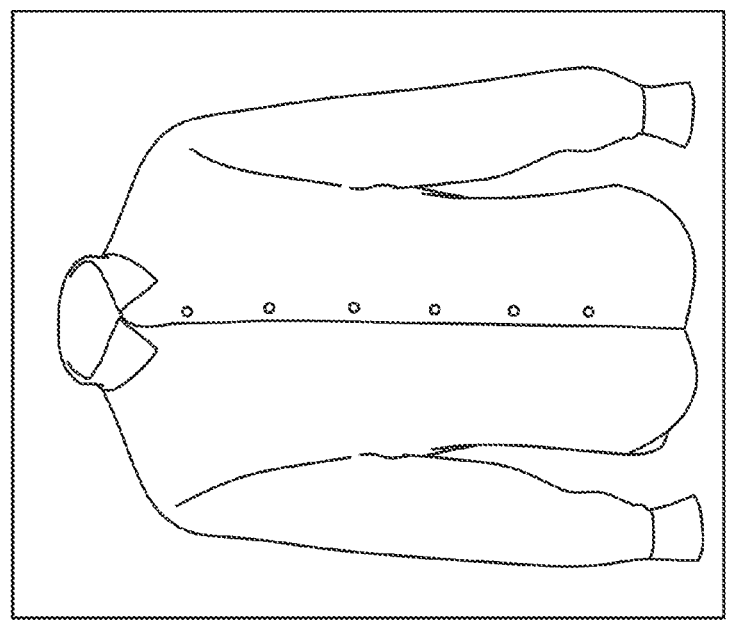

According to an aspect, whenever a matching of a 2D pattern and a pattern block is achieved, the 2D pattern is automatically arranged around a 3D model. Accordingly, as patterns are sewn together as shown in FIG. 4, a 3D piece of clothing fitted on the 3D model is generated. As will be described later, the pattern block may include position information for a 2D pattern to be arranged around a 3D model.

According to an aspect, the generating of a pattern/block DB S4 converts the matched 2D clothing patterns and the pattern blocks into a DB. According to one exemplary embodiment, as many types of pattern blocks as there are types of 3D clothing may be generated. For example, when the types of 3D clothing are a shirt, a skirt, a dress, and pants, standardized types of pattern blocks forming the types of 3D clothing exist. Further, when 2D clothing patterns form the same type of 3D clothing, a shape of the pattern may be different according to a clothing design. For example, in the case of a woman's blouse formed of the same pattern block as that of a man's shirt, a 2D pattern of a body portion of the woman's blouse may be folded into waist pleats unlike the man's shirt. Also, in the case of a 2D pattern of a shirt sleeve, lengths of the 2D pattern may be different among a three-quarter sleeve, a seven-eighths sleeve, and a long-sleeve. Also, the pattern design of a sleeve or a collar may be different between a T-shirt and a dress shirt. Accordingly, pattern blocks to be standardized according to types of clothes and 2D patterns according to various clothing designs are matched with each other to form a DB and are provided to a 3D clothing producer.

According to an aspect, the selecting of a pattern block S5 selects a pattern block matched with a 2D clothing pattern from the pattern/block DB. According to one exemplary embodiment, the 3D clothing producer that has received the pattern/block DB may select a desired 2D pattern for each portion of a piece of clothing among 2D patterns that are matched with the pattern block from the pattern/block DB.

According to an aspect, the automatic sewing S6 automatically sews 2D clothing patterns, which are matched with the selected pattern blocks, together according to sewing information of the pattern blocks.

Figure 5:
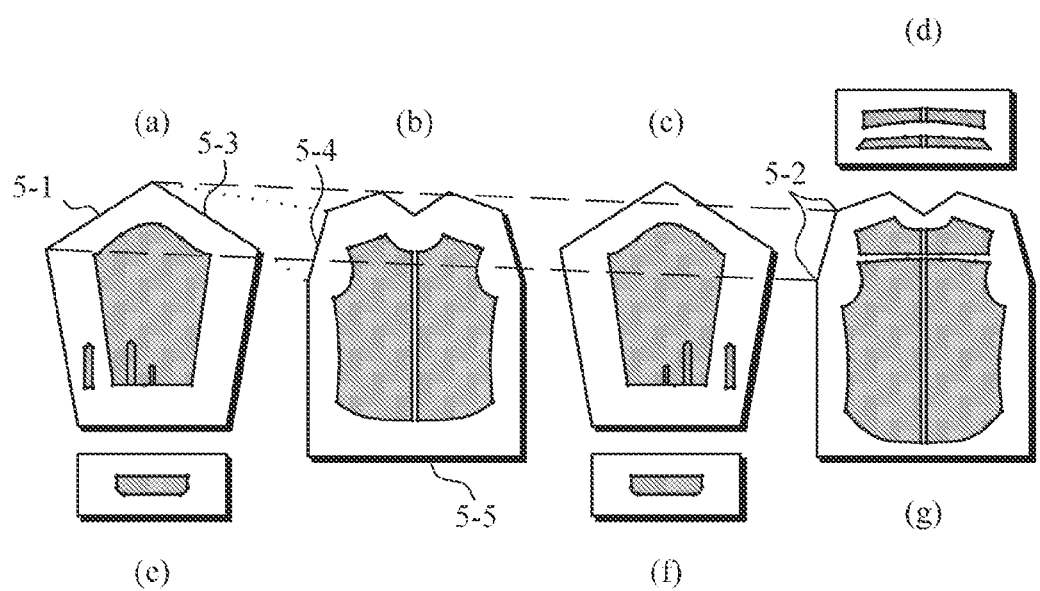
FIG. 5 is a diagram illustrating 2D clothing patterns and pattern blocks matched with each other according to another exemplary embodiment.

As described above, sewing information between pattern blocks that determine one type of 3D clothing is set in the pattern blocks. FIG. 5 is a diagram illustrating patterns and pattern blocks matched with each other when the type of 3D clothing is a shirt. In FIG. 5, border information for sewing patterns of a body portion and a sleeve forming a shirt is indicated with a dotted line. For example, in the pattern blocks shown in FIG. 5, an upper left edge 5-1 of a pattern block a corresponding to the sleeve and an upper left edge 5-2 of a pattern block b corresponding to the body portion are set to be sewn together. In other words, the pattern block sets a border of a pattern corresponding to the edge 5-1 as a unit of a sewing line and sets an edge of a pattern corresponding to the edge 5-2 as a unit of a sewing line so that the two sewing lines are sewn together. Without an additional sewing command, patterns are matched with pattern blocks corresponding thereto so that a sewing command is automatically set at each edge of the patterns, thereby achieving an effect of automatically sewing the patterns together. The above description of FIG. 5 is provided as an example, and in the pattern block, sewing information about a pattern to be matched with the pattern block may be set at each edge. According to one exemplary embodiment, the sewing information may include information about a portion not requiring sewing. For example, since an bottom portion of a bodice of shirt needs to be open, the sewing information may be set so that sewing is not performed on an edge 5-5. Also, as described above, a pattern block may include position information for arranging a 2D pattern to be matched with the pattern block around a 3D model. Accordingly, whenever a 2D pattern is matched with the pattern block, the same pattern as the 2D pattern is arranged at a proper position around the 3D model. For example, a pattern of a sleeve portion is arranged around an arm of the 3D model.

According to an aspect, the matching of a pattern/block S3 may further include an automatic matching in which input 2D clothing patterns are automatically matched to pattern blocks by analyzing shapes of the input 2D clothing patterns. As described above, a user may directly select 2D patterns and pattern blocks to be matched with each other, but according to another exemplary embodiment, by only inputting a clothing pattern and selecting the type of pattern block, the clothing pattern may be matched with a pattern block. For example, when a shirt is being produced, all 2D patterns forming the shirt are input and pattern blocks corresponding to the shirt are selected for retrieval from the DB so that 2D patterns are automatically matched with the pattern blocks corresponding thereto so that the 2D patterns is arranged to be enclosed by the pattern blocks without an additional input of a user. According to another exemplary embodiment, whenever a 2D pattern is input, the 2D pattern may be automatically matched with a pattern block. According to one exemplary embodiment, the automatic matching may be implemented by previously corresponding shape information of a 2D pattern to a pattern block and generating a DB. For example, whenever a 2D pattern is input, a shape of the 2D pattern is analyzed to acquire shape information of the input 2D pattern, and a pattern block corresponding to the acquired shape information is retrieved from the DB so that the pattern block is automatically matched with the 2D pattern. For example, the automatic matching may be performed through deep learning which learns/recognizes shapes of a 2D pattern and a pattern block.

According to an aspect, the matching of a pattern/block S3 further includes verifying the matching which verifies whether the 2D clothing pattern matched with the pattern block is a pattern corresponding to the pattern block.

For example, when a user directly matches 2D clothing patterns to pattern blocks, a 2D clothing pattern and a pattern block that do not correspond to each other may be erroneously matched with each other. In this case, sewing information for the 2D pattern is erroneously set, and the generation of a piece of clothing may fail or an abnormal sewing may occur. According to one exemplary embodiment, in order to prevent such an error, whether the 2D clothing pattern matched with the pattern block is a pattern corresponding to the pattern block may be verified through the verifying of the matching. In one exemplary embodiment, the verifying of the matching may be performed by using the automatic matching method described above. For example, whether the matching of shape information of the 2D pattern and the pattern block coincides with corresponding information (the 2D pattern shape—the pattern block) stored in the DB may be verified. According to another exemplary embodiment, the verifying of the matching may be achieved by verifying whether the number of edges of a pattern block is the same as the number of edges of a 2D pattern. In addition, proper matching may be verified through an angle formed by an edge of a pattern block and a border of a 2D pattern. The matching verification method is not limited thereto, and may be implemented in various ways using information about a 2D pattern and information about a pattern block.

In one aspect, the inputting of a pattern S1 may further include selecting a clothing template to select a clothing template which is a group of 2D clothing patterns forming a piece of 3D clothing. In one exemplary embodiment, the clothing template is a group of patterns that form a piece of clothing for each type of clothing. For example, there are various types of clothes, such as a shirt, a skirt, pants, a jacket, and a coat. For a piece of clothing corresponding to a general type of clothing in the clothes industry, information about patterns forming the piece of clothing is standardized. The clothing template is a DB of each piece of pattern information. For example, a clothing template of a shirt is provided as the patterns shown in FIG. 2.

However, a configuration of the clothing template is not fixed to one form. For example, even the same shirt may vary depending on a configured DB. For example, FIG. 4 shows a shirt that has no pocket, but a shirt that has a pocket may be provided as a clothing template in a DB.

According to an aspect, the draping simulation method further includes, before the automatic sewing, an automatic grading for comparing lengths of 2D patterns to be sewn together and automatically grading sizes of the 2D patterns so that the lengths are the same.

According to one exemplary embodiment, 2D patterns matched with pattern blocks may vary in size from each other. Accordingly, lengths of borders of the 2D patterns to be connected to each other are compared according to the automatic sewing information, and the lengths of the boarders may be changed to be the same when the lengths are different from each other. At this time, sizes of the 2D patterns may be graded together with the change in the lengths of the borders of the 2D patterns According to another embodiment, the size of the 2D pattern matched with the pattern block may be adjusted. For example, a size of a piece of 3D clothing may be set in advance as S/M/L based on a body size of a 3D model. Accordingly, when one of the sizes S/M/L is selected, 2D patterns may be automatically graded to a size corresponding to the selected size. Alternatively, the size of the 2D pattern may be changed to an arbitrary size through interpolation or extrapolation The 3D clothing draping simulation method according to the proposed invention may be manufactured as a downloadable computer program and stored in a nonvolatile recording medium readable by a computer. Examples of the computer-readable recording medium include a read-only memory (ROM), a random access memory (RAM), a compact disc read-only memory (CD-ROM), a magnetic tape, a floppy disk, an optical data storage device, and the like, and may also be implemented in the form of a carrier wave (for example, transmission over the Internet).

Figure 7:
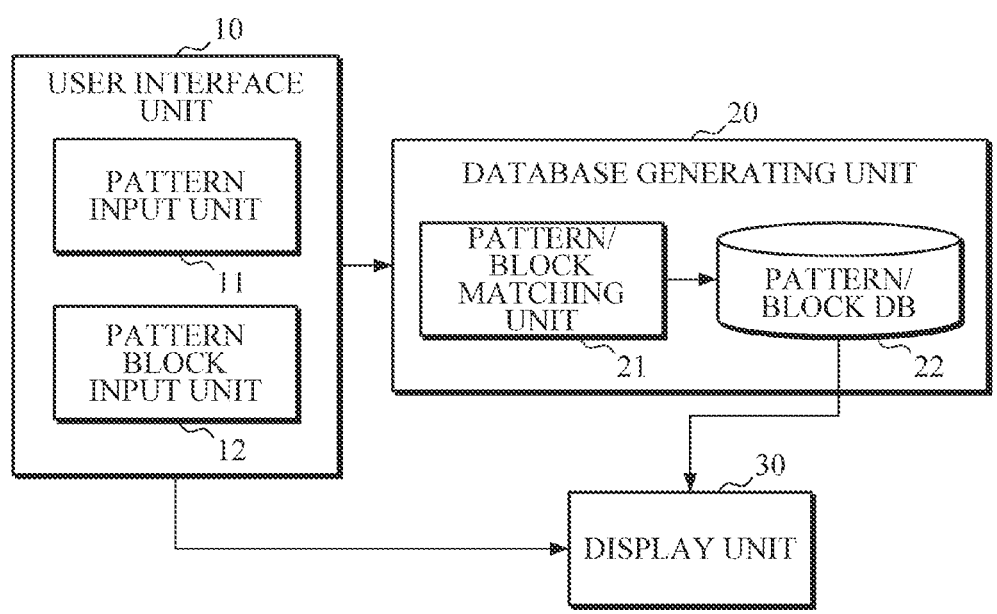
FIG. 7 is a diagram illustrating a configuration of a clothing pattern database (DB) generation apparatus an according to one exemplary embodiment.

FIG. 7 is a diagram illustrating a configuration of a clothing pattern DB generation apparatus which converts pattern block information into a DB according to one exemplary embodiment. As shown in FIG. 7, the clothing pattern DB generation apparatus includes a user interface unit 10, a DB generating unit 20, and a display unit 30

In one exemplary embodiment, the user interface unit 10 includes a pattern input unit 11 and a pattern block input unit 12, and the DB generating unit 20 includes a pattern/block matching unit 21 and a pattern/block DB 22.

According to one aspect, the pattern input unit 11 inputs a 2D clothing pattern. In one exemplary embodiment, the input of the 2D pattern may be achieved by receiving a figure corresponding to a shape of the 2D pattern from a user through an input device such as a mouse.

According to one aspect, the pattern block input unit 12 inputs a pattern block. As described above, the pattern block includes edges respectively corresponding to sewing units of the 2D clothing pattern, and automatic sewing information about each sewing unit of the 2D clothing pattern is set at each of the edges. In one exemplary embodiment, pattern blocks may be selected one at a time whenever a 2D pattern is input, or a pattern block group corresponding to a clothing template may be selected when the clothing template is selected.

According to one aspect, the pattern/block matching unit 21 matches the input 2D clothing pattern to the input pattern block. According to one exemplary embodiment, the matching may be performed by an input of a user or automatically performed whenever a pattern is input.

According to one aspect, the 3D clothing draping simulation apparatus includes the pattern/block DB 22 in which matched 2D clothing patterns and pattern blocks are registered as a DB. In one exemplary embodiment, for pattern blocks forming a single piece of clothing, 2D design patterns of various designs may be matched with each pattern block. For example, for a pattern block corresponding to a shirt sleeve, 2D patterns having different lengths, such as a three-quarter sleeve, a seven-eighths sleeve, and a long-sleeved sleeve, or having different details of a shoulder or sleeve depending on a difference between men/women may be matched. Accordingly, various 2D patterns may be matched with a corresponding pattern block, the matched 2D patterns and pattern blocks may be converted into a DB, and the DB may be provided to a user such that the user selects 2D patterns that are matched with the pattern block and have a desired design.

According to an aspect, the display unit 30 may output an input 2D clothing pattern and a 3D pattern block on a screen. According to one exemplary embodiment, the display unit 30 may output the input 2D pattern and provide the 2D pattern to a user through the screen. The input 2D pattern may be output to the screen by reflecting an input of attribute information (a contour, a mesh shape, etc.) of the 2D pattern input by the user whenever attribute information is input. Furthermore, the display unit 30 may output an input pattern block to provide the pattern block to the user through the screen. In addition, the display unit 30 may output an appearance of a 2D pattern and a pattern block that are matched with each other and provide the appearance to the user through the screen.

According to an aspect, the pattern/block matching unit 21 includes an automatic matching unit configured to analyze shapes of input 2D clothing patterns and automatically match the 2D clothing patterns to a pattern block. In one exemplary embodiment, the automatic matching unit may automatically perform matching by only an input of a clothing pattern and a selection of a type of a pattern block. For example, in a case in which a shirt is being produced, all 2D patterns forming the shirt are input and pattern blocks corresponding to the shirt are selected for retrieval from the DB so that 2D patterns are automatically matched with the pattern blocks corresponding thereto so that 2D patterns are arranged to be enclosed by the pattern blocks without an additional input of a user. According to another exemplary embodiment, the automatic matching unit may automatically match a 2D pattern block to a pattern block whenever a 2D pattern is input. According to one exemplary embodiment, the automatic matching may be implemented by previously corresponding shape information of a 2D pattern to a pattern block and generating a DB. For example, whenever a 2D pattern is input, a shape of the 2D pattern is analyzed to acquire shape information of the input 2D pattern, and a pattern block corresponding to the acquired shape information is retrieved from the DB so that the pattern block is automatically matched with the 2D pattern. For example, the automatic matching may be performed through deep learning which learns/recognizes shapes of a 2D pattern and a pattern block.

According to an aspect, the pattern/block matching unit further includes a matching verification unit configured to verify whether a 2D clothing pattern matched with a pattern block is a pattern that corresponds to the pattern block. For example, when a user directly matches 2D clothing patterns to pattern blocks, a 2D clothing pattern and a pattern block that do not correspond to each other may be erroneously matched with each other. In this case, sewing information for the 2D pattern is erroneously set and the generation of a piece of clothing may fail or an abnormal sewing may occur. In order to prevent such an error, according to one exemplary embodiment, the matching verification unit verifies whether a 2D clothing pattern matched with a pattern block is a pattern that corresponds to the pattern block. In one exemplary embodiment, the matching verification unit may use the automatic matching method described above. For example, the matching verification unit may verify whether the matching of shape information of a 2D pattern and a pattern block coincides with corresponding information (a 2D pattern shape—a pattern block) stored in the DB. According to another exemplary embodiment, the matching verification unit may verify whether the number of edges of a pattern block is the same as the number of edges of a 2D pattern. In addition, the matching verification unit may verify a proper matching through an angle formed by an edge of a pattern block and a border of a 2D pattern. The matching verification method of the matching verification unit is not limited thereto, and may be implemented in various ways using information about a 2D pattern and information about a pattern block.

In one aspect, the pattern input unit 11 may further include a 2D clothing template selection unit configured to select a clothing template which is a group of 2D clothing patterns forming a piece of 3D clothing. In one exemplary embodiment, the clothing template is a group of patterns that form a piece of clothing for each type of clothing. For example, there are various types of clothes, such as a shirt, a skirt, pants, a jacket, and a coat. For a piece of clothing corresponding to a general type of clothing in the clothes industry, information about patterns forming the piece of clothing is standardized. A user may simultaneously input 2D patterns forming a desired piece of clothing through the 2D clothing template selection unit.

Figure 8:
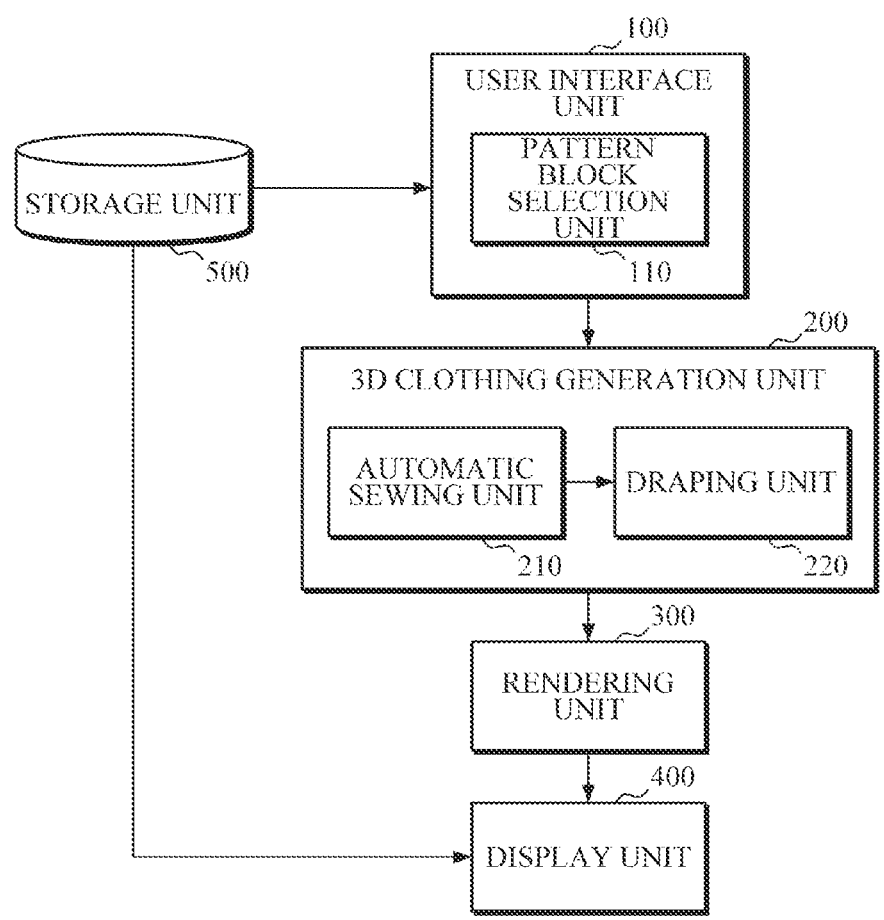
FIG. 8 is a diagram illustrating a configuration of a 3D clothing draping simulation apparatus according to one exemplary embodiment.

FIG. 8 is a block diagram illustrating a configuration of a 3D clothing draping simulation apparatus which generates a piece of 3D clothing by using a pattern block according to one exemplary embodiment.

According to one exemplary embodiment, a 3D clothing draping simulation apparatus includes a storage unit 500, a 3D clothing generation unit 200, a user interface unit 100, a rendering unit 300, and a display unit 400.

In one exemplary embodiment, the storage unit 500 may store and use avatars, patterns and closures that are required to generate a piece of 3D clothing. The storage unit 500 may store 3D avatar models of various people having different sexes, races, faces, hairstyles, and body skeletons. Avatar information stored for each body part may be combined to be used when a new avatar is generated. The storage unit 500 may store a DB of patterns according to the types of clothing used in the clothing industry. Alternatively, the storage unit 500 may store 2D patterns input through a CAD tool and provide the stored 2D patterns to a 2D pattern production unit. The storage unit 500 may store various 3D closures, such as a zipper, a button, piping, and a ribbon, and provide the stored 3D closures to generate a piece of 3D clothing.

In another embodiment, the storage unit 500 may store 2D pattern information, pattern block information, and matching information of the 2D pattern and the pattern block according to clothing type in a DB.

In one exemplary embodiment, the 3D clothing generation unit 200 includes a draping unit 220. The draping unit 220 arranges a 2D pattern around an avatar model, and then dresses the model with the 2D pattern through the draping process described above.

In one exemplary embodiment, the display unit 400 outputs a piece of 3D clothing that has been completed by 3D clothing generation and then rendered by the rendering unit 300 to a screen. In one exemplary embodiment, the piece of 3D clothing may be output together with an avatar in a state of being worn by the avatar. Alternatively, only the avatar may be output or only the 3D clothing may be output. As another example, the display unit 400 may display a piece of clothing only in the form of meshes completed deformed according to draping, or may provide a piece of clothing expressed in the form of a pressure distribution diagram of the piece of clothing as information for clothing production. According to one exemplary embodiment, the display unit 400 may output a 3D view in which a 3D clothing-dressed avatar is viewed from all angles, such as from above, below, the left, the right, the rear, and the front. For example, when an output angle of a 3D screen is determined through an input device such as a mouse or a keyboard operated by a user, a piece of 3D clothing and an avatar are output through a 3D view viewed from the determined angle.

According to an aspect, the user interface unit 100 includes a pattern block selection unit 110 configured to select a pattern block matched with a 2D clothing pattern from the pattern/block DB. In one exemplary embodiment, the user may select a desired type of 3D clothing from the pattern/block DB through the pattern block selection unit 110, and select pattern blocks matched with 2D patterns forming the corresponding type of 3D clothing. In this manner, the user may select 2D patterns desired for each pattern block forming a piece of 3D clothing.

According to an aspect, the 3D clothing generation unit 200 includes an automatic sewing unit 210 that automatically sews 2D clothing patterns, which are matched with selected pattern blocks, together according to sewing information of the pattern blocks. As described above, in the pattern blocks, sewing information between the pattern blocks that determine one 3D clothing type is set. Accordingly, as patterns are matched with pattern blocks corresponding thereto, a sewing command is automatically set at each edge of the pattern without receiving the sewing command and the automatic sewing unit 210 automatically performs sewing according to the set command.

According to another aspect, the automatic sewing unit 210 further includes an automatic grading unit that compares lengths of borders of 2D patterns to be sewn to each other and automatically grades sizes of the 2D patterns so that the lengths are the same. According to one exemplary embodiment, 2D patterns matched with pattern blocks may vary in size. Accordingly, the automatic sewing unit 210 may compare the lengths of the border of the 2D patterns to be connected with each other according to automatic sewing information, and may change the lengths of the border of the 2D patterns to be the same when the lengths of the border are different from each other. In this case, the sizes of the 2D patterns may be graded together with the change in the lengths of the border of the 2D patterns.

The proposed invention provides a system for providing a 3D clothing draping simulation. According to one exemplary embodiment, the system for providing a 3D clothing draping simulation includes a clothing pattern DB generation apparatus and a 3D clothing draping simulation apparatus. Details of each configuration of the clothing pattern DB generation apparatus and the 3D clothing draping simulation apparatus include the descriptions provided above with reference to FIGS. 7 and 8.

According to one exemplary embodiment, the clothing pattern DB generation apparatus includes a pattern block input unit, a pattern/block matching unit, and a pattern/block DB.

According to one aspect, the pattern input unit inputs a 2D clothing pattern.

According to an aspect, the pattern block input unit inputs a pattern block.

According to one aspect, the pattern block matching unit matches the input 2D clothing pattern to the input pattern block.

According to one aspect, the pattern/block DB includes a pattern/block DB in which matched 2D clothing patterns and pattern blocks are registered as a DB.

According to one exemplary embodiment, the 3D clothing draping simulation apparatus includes a pattern block selection unit, an automatic sewing unit, a draping unit, and a display unit.

In one aspect, the pattern block selection unit selects a pattern block matched with a 2D clothing pattern from the pattern block DB received from the clothing pattern DB generation apparatus.

In one aspect, the automatic sewing unit automatically sews 2D clothing patterns matched with the selected pattern blocks according to sewing information of the pattern blocks.

In one aspect, the draping unit drapes the 2D clothing patterns on an avatar model.

In one aspect, the display unit renders and displays a result of the draping.

As should be apparent from the above, grouped 2D patterns and the sewing information are created as a DB and are expressed and provided as visual information.

2D patterns are automatically sewn together through the provided DB without setting a seam so that an effort and time required to produce a piece of 3D clothing are reduced.

Although an exemplary embodiment of the present invention has been described for illustrative purposes, those skilled in the art should appreciate that various modifications, changes, and substitutions are possible without departing from the scope and spirit of the invention. Therefore, the exemplary embodiments disclosed in the present invention and the accompanying drawings are intended illustrate and not limit the technical spirit of the present invention, and the scope of the present invention is not limited by the exemplary embodiments and the accompanying drawings. The scope of protection of the present invention should be construed on the basis of the accompanying claims and all of the technical ideas included within a scope equivalent to the claims should be construed as belonging thereto.

What is claimed is:

1. A clothing pattern database generation apparatus comprising:
 a processor configured to:
  input a 2D clothing pattern;
  input a pattern block;
  match the 2D clothing pattern to the pattern block; and
  register the matched 2D clothing pattern and pattern block in a pattern/block database,
   wherein the pattern block is matched with a plurality of 2D clothing patterns of different designs including the 2D clothing pattern.

2. The apparatus of claim 1, wherein the pattern block includes edges respectively corresponding to sewing units of the 2D clothing pattern, and automatic sewing information about the sewing unit of the 2D clothing pattern corresponding to each of the edges is set at the edges.

3. The apparatus of claim 1, wherein the processor is further configured to, when matching the 2D clothing pattern to the pattern block,
 automatically match the 2D clothing pattern to the pattern block by analyzing a shape of the 2D clothing pattern.

4. The apparatus of claim 1, wherein the processor is further configured to, verify whether the 2D clothing pattern matched with the pattern block is a pattern corresponding to the pattern block.

5. The apparatus of claim 1, wherein the pattern block corresponds to a shape that encloses the 2D clothing pattern forming a piece of a 3D clothing, wherein the shape corresponding to the pattern block is predefined according to a type of the 3D clothing.

6. A 3D clothing draping simulation apparatus comprising:
 a processor configured to:
 store a 3D avatar model and 2D clothing patterns,
 drape the 2D clothing patterns on the 3D avatar model;
 render and display a result of the draping;
 select pattern blocks from a pattern/block database storing predefined pattern blocks, respective predefined pattern blocks being matched to corresponding 2D clothing patterns; and
 automatically sew 2D clothing patterns matched with the selected pattern blocks together according to sewing information of the selected pattern blocks,
  wherein each of the predefined pattern blocks comprises edges respectively corresponding to sewing units of the corresponding 2D clothing patterns, and
  wherein automatic sewing information about the sewing units of the 2D clothing patterns is set at corresponding edges of the predefined pattern blocks.

7. The apparatus of claim 6, wherein the processor is further configured to, when automatically sewing the 2D clothing patterns:
 compare lengths of borders of the 2D clothing patterns to be connected with each other; and
 automatically grade sizes of the 2D clothing patterns to adjust the lengths of the borders of the 2D clothing patterns for sewing together.

8. The apparatus of claim 6, wherein the processor is further configured to:
 receive an input 2D clothing patterns respectively forming a piece of a clothing;
 receive an input pattern blocks respectively comprising sewing information about corresponding 2D clothing patterns;
 match the input 2D clothing patterns to the input pattern blocks; and
 register the matched 2D clothing patterns and pattern blocks in the pattern/block database.

* * * * *